United States Patent [19]
Singh et al.

[11] Patent Number: 5,880,174
[45] Date of Patent: Mar. 9, 1999

[54] AMINE MODIFIED POLYISOCYANATES AND THEIR USE IN FOUNDRY BINDER SYSTEMS

[75] Inventors: Rina Singh, Westerville; Laurence G. Dammann, Powell, both of Ohio

[73] Assignee: Ashland Inc., Columbus, Ohio

[21] Appl. No.: 743,766

[22] Filed: Nov. 7, 1996

[51] Int. Cl.$^6$ ............................... C08J 3/00; C08K 3/20; C08L 75/00; B22C 1/22
[52] U.S. Cl. ..................... 523/142; 164/526; 164/527; 523/143; 524/590; 525/540
[58] Field of Search .................... 523/142, 143; 524/590; 525/540; 164/526, 527

[56] References Cited

U.S. PATENT DOCUMENTS

| | | | |
|---|---|---|---|
| 3,409,579 | 11/1968 | Robins et al. | 260/30.4 |
| 3,769,318 | 10/1973 | Windemuth et al. | 260/471 |
| 4,160,080 | 7/1979 | Köenig et al. | 528/59 |
| 4,177,342 | 12/1979 | Bock et al. | 528/45 |
| 4,396,738 | 8/1983 | Powell et al. | 524/228 |
| 4,403,086 | 9/1983 | Holubka et al. | 528/45 |
| 4,507,408 | 3/1985 | Torbus et al. | 523/143 |
| 4,526,912 | 7/1985 | Biorcio et al. | 523/456 |
| 4,554,188 | 11/1985 | Holubka et al. | 427/393.5 |
| 4,738,991 | 4/1988 | Narayan | 521/124 |
| 4,760,101 | 7/1988 | Fechter et al. | 523/143 |
| 4,946,876 | 8/1990 | Carpenter et al. | 523/143 |
| 5,074,979 | 12/1991 | Valko et al. | 204/181.7 |
| 5,283,311 | 2/1994 | Narayan et al. | 528/49 |
| 5,319,053 | 6/1994 | Slack et al. | 528/48 |
| 5,440,003 | 8/1995 | Slack | 528/48 |
| 5,447,968 | 9/1995 | Barnett et al. | 523/142 |
| 5,516,859 | 5/1996 | Dunnavant et al. | 525/504 |

FOREIGN PATENT DOCUMENTS 994890  6/1965  United Kingdom.

*Primary Examiner*—Patrick D. Niland
*Attorney, Agent, or Firm*—David L. Hedden

[57] ABSTRACT

The invention relates to amine modified polyisocyanates having urea linkages and their use in foundry binder systems. The modified polyisocyanates are prepared by reacting a polyisocyanate with an aliphatic primary or secondary amine. These amine modified polyisocyanates, along with a phenolic resole resin, are added to a foundry aggregate to form a foundry mix which is shaped and cured with an amine curing catalyst.

16 Claims, 1 Drawing Sheet

AMINE MODIFIED POLYISOCYANATES AND THEIR USE IN FOUNDRY BINDER SYSTEMS

FIELD OF THE INVENTION

The invention relates to amine modified polyisocyanates containing urea linkages, and foundry binder systems which use the amine modified polyisocyanates. The amine modified polyisocyanates are prepared by reacting a polyisocyanate with an aliphatic primary or secondary amine. These amine modified polyisocyanates, along with a phenolic resole resin, are added to a foundry aggregate to form a foundry mix which is shaped and cured with an amine curing catalyst.

BACKGROUND OF THE INVENTION

One of the major processes used in the foundry industry for making metal parts is sand casting. In sand casting, disposable foundry shapes (usually characterized as molds and cores) are made by shaping and curing a foundry mix which is a mixture of sand and an organic or inorganic binder. The binder is used to strengthen the molds and cores.

Two of the major processes used in sand casting for making molds and cores are the no-bake process and the cold-box process. In the no-bake process, a liquid curing agent is mixed with an aggregate and shaped to produce a cured mold and/or core. In the cold-box process, a gaseous curing agent is passed through a compacted shaped mix to produce a cured mold and/or core. Polyurethane-forming binders, cured with a gaseous tertiary amine catalyst, are often used in the cold-box process to hold shaped foundry aggregate together as a mold or core. See for example U.S. Pat. No. 3,409,579. The polyurethane-forming binder system usually consists of a phenolic resin component and polyisocyanate component which are mixed with sand prior to compacting and curing to form a foundry mix.

SUMMARY OF THE INVENTION

This invention relates amine modified polyisocyanates containing urea linkages prepared by reacting a primary or secondary amine with a polyisocyanate and to polyurethane-forming foundry binder systems curable with a catalytically effective amount of an amine curing catalyst comprising as separate components:

(A) a phenolic resin component; and (B) a polyisocyanate component comprising a polyisocyanate modified with an aliphatic primary or secondary amine.

The foundry binder systems are particularly useful for making foundry mixes used in the cold-box and no-bake fabrication processes for making foundry shapes. Foundry mixes are prepared by mixing component A and B with an aggregate. The foundry mixes are preferably used to make molds and cores by the cold-box process which involves curing the molds and cores with a gaseous tertiary amine. The cured molds and cores are used to cast ferrous and non ferrous metal parts. The modified polyisocyanates react with phenolic resins in a non-aqueous medium in the presence of an gaseous tertiary amine curing catalyst. The isocyanate (NCO) content decreases by the reaction of the polyisocyanate with the aliphatic amine. The amount of decrease depends upon the amount of modification, but there is still sufficient isocyanate content in the modified polyisocyanate to cure with the phenolic resin component. The use of the modified polyisocyanates results in the improved release properties from molds, increased moisture resistance and improved binder strength.

BRIEF DESCRIPTION OF THE DRAWING

FIG. 1 compares the pressures needed to release cores from a corebox where the binders are made from unmodified polyisocyanates (outside the scope of the invention) to the pressures needed where the cores are made with modified polyisocyanates (within the scope of the invention).

DETAILED DESCRIPTION OF THE INVENTION INCLUDING THE BEST MODE

Figure 1:
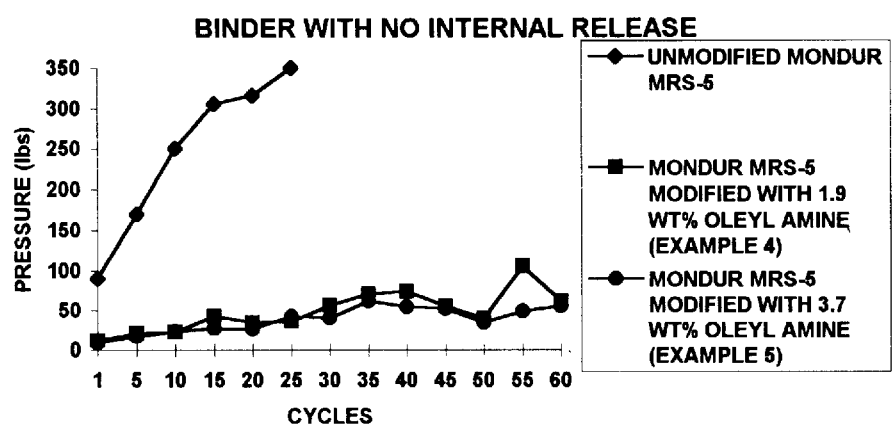
FIG. 1 shows the pressure needed to release a core from a corebox as the number of coremaking cycles increase.

For purposes of describing this invention, "polyisocyanate" includes "diisocyanate", and "polyisocyanates suitable for modification" includes any polyisocyanate. The polyisocyanate component of the binder system contains at least one modified polyisocyanate, and has a functionality of two or more, preferably 2 to 5. A modified polyisocyanate is a polyisocyanate which is reacted with an aliphatic primary or secondary amine such that at least some of the isocyanate groups form urea linkages.

The modified polyisocyanates can be diluted with unmodified polyisocyanates including aliphatic, cycloaliphatic, aromatic, hybrid polyisocyanates, quasi-prepolymers, and prepolymers as mentioned before such as those used to prepare the modified polyisocyanates. The unmodified polyisocyanates typically have an NCO content of 2 weight percent to 50 weight percent, preferably from 15 to 35 weight percent. The amount of the modified polyisocyanate in the polyisocyanate component typically is from 1 weight percent to 100 weight percent based upon the total weight of the polyisocyanate in the polyisocyanate component, preferably from 2 weight percent to 16 weight percent.

The modified polyisocyanates typically have an NCO content from 1 to 50 weight percent, preferably from 12 to 33 weight percent after modification. Particular polyisocyanates which are suitable for modification with the aliphatic primary or secondary amines include aromatic polyisocyanates, aliphatic and/or cycloaliphatic polyisocyanates, and mixtures thereof. Representative aromatic polyisocyanates include m-phenylene diisocyanate, 2,4-toluene diisocyanate, 2,6-toluene diisocyanate, mixtures of 2,4- and 2,6-toluene diisocyanate, naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4', 4"-triphenylmethane triisocyanate, and toluene 2,4,6-triisocyanate; and the tetraisocyanates such as 4,4'-dimethyldiphenylmethane-2,2',5,5'-tetraisocyanate. Especially useful due to their availability and properties are toluene diisocyanate, 4,4'-diphenylmethane diisocyanate, and polymeric polyisocyanates such as polymethylene polyphenylene polyisocyanate.

Representative aliphatic polyisocyanates which are suitable for modification include hexamethylene diisocyanate, tetramethylene diisocyanate, cyclohexane-1,4-diisocyanate, hexahydrotoluene diisocyanate (and isomers), isophorone diisocyanate, and cyclic polyisocyanates such as 4,4'-dicyclohexylmethane diisocyanate. Also suitable are various prepolymers, and trimers based on these polyisocyanates, be they aromatic or aliphatic.

Representative of mixed polyisocyanates include for example mixtures of aromatic polyisocyanates with other aromatic polyisocyanates or aliphatic polyisocyanates, or for example mixed trimers of aromatic and aliphatic polyisocyanates.

Suitable amines which can be used to modify the polyisocyanates can be represented by the following structural formulae (I) and (II):

  (I)

  (II)

where R and R' are alkyl groups that can be branched or linear having 1 to 50 carbon atoms, preferably from 1 to 20 carbon atoms. R or R' can include, along their chain, carbon—carbon double or triple bonds, an aromatic ring, or even other functional groups as long as they are not reactive with the isocyanate.

Representative examples of primary amines include n-hexyl amine, n-heptyl amine, n-octyl amine, n-nonyl amine, n-decyl amine, lauryl amine, myristyl amine, cetyl amine, stearyl amine, arachidyl amine, behenyl amine, isohexyl amine, 2-ethyl isohexanol amine, iso octyl amine, isononyl amine, isodecyl amine, isotridecyl amine, isocetyl amine, isostearyl amine, oleyl amine, phenylethyl amine and linoleyl amine. Representative secondary amines include di-n-butyl amine, di-iso-octylamine, di-n-lauryl amine, di-stearyl amine, di-phenethyl amine, di-oleyl amine, di-linoleyl amine, N-methylstearyl amine, and N-methyl oleyl amine.

The mole ratio of polyisocyanate to amine used to form the modified polyisocyanate is from 0.5 to 100 mole %, preferably about 0.5 to 50 mole %.

The modified isocyanates are prepared by mixing the polyisocyanate with the aliphatic amine. Preferably, the amine and/or polisocyanate is cooled, preferably to a temperature of 5° C. to –30° C. The modified polyisocyanates can also be prepared in-situ at the required concentration by addition of the aliphatic primary or secondary amine which reacts with the polyisocyanate component. Modified isocyanates also include mixtures of primary or secondary amines in structural formulae (I) and (II) in combination with suitable aclohols to provide polyurea-urethane-isocyanates. Suitable alcohols which can be used to modify the polyisocyanates can be represented by the following structural formula:

ROH where R is a linear or branched aliphatic group having 2 to 50 carbon atoms, preferably from 6 to 30 carbon atoms. R can include, along its chain, carbon—carbon double or triple bonds, an aromatic ring, or even other functional groups as long as they are not reactive with the isocyanate. The hydrogen atoms in R can in addition be partially or totally replaced with fluorine atoms.

Representative examples of such alcohols include mono alcohols such as n-hexyl alcohol, n-heptyl alcohol, n-octyl alcohol, n-nonyl alcohol, n-decyl alcohol, lauryl alcohol, myristyl alcohol, cetyl alcohol, stearyl alcohol, arachidyl alcohol, behenyl alcohol, isohexyl alcohol, 2-ethyl hexanol, 2-ethyl isohexanol, iso octyl alcohol, phenethyl alcohol, isononyl alcohol, isodecyl alcohol, isotridecyl alcohol, isocetyl alcohol, isostearyl alcohol, oleyl alcohol, and linoleyl alcohol. Perfluorinated alcohols such as 1H, 1H, 5H-octafluoro-1-pentanol, 1H, 1H-heptafluoro-1-butanol, 1H, 1H-perfluoro-1-octanol, 1H, 1H, 2H, 2H-dodecafluoro-1-heptanol, N-ethyl-N-2-hydroxyethylperfluorooctane sulfonamide, and the like are also suitable. Mixtures of these alcohols can also be used. The mole ratio of the alcohol and amine to polyisocyanate used to form the modified polyisocyanate is from 0.5 to 100 mole %, preferably about 0.5 to 50 mole %. The equivalent ratio of amiine to alcohol is from 3:1 to 1:3, preferably from 2:1 to 1:2. The polyisocyanates are used in sufficient concentrations to cause the curing of the polybenzylic ether phenolic resin with an amine curing catalyst. In general the isocyanate ratio of the polyisocyanate to the hydroxyl of the polybenzylic ether phenolic resin is from 0.75:1.25 to 1.25:0.75, preferably about 0.9:1.1 to 1.1:0.9. The polyisocyanate is used in a liquid form. Solid or viscous polyisocyanates must be used in the form of organic solvent solutions, the solvent generally being present in a range of up to 80 percent by weight of the solution.

The phenolic resin component of the binder system comprises a phenolic resole resin, preferably a polybenzylic ether phenolic resin. The phenolic resole resin is prepared by reacting an excess of aldehyde with a phenol in the presence of either an alkaline catalyst or a divalent metal catalyst according to methods well known in the art. Solvents, as specified, are also used in the phenolic resin component along with various optional ingredients such as adhesion promoters and release agents.

The polybenzylic ether phenolic resin is prepared by reacting an excess of aldehyde with a phenol in the presence of a divalent metal catalyst according to methods well known in the art. The polybenzylic ether phenolic resins used to form the subject binder compositions are polybenzylic ether phenolic resins which are specifically described in U.S. Pat. No. 3,485,797 which is hereby incorporated by reference into this disclosure.

These polybenzylic ether phenolic resins are the reaction products of an aldehyde with a phenol. They preferably contain a preponderance of bridges joining the phenolic nuclei of the polymer which are ortho-ortho benzylic ether bridges. They are prepared by reacting an aldehyde and a phenol in a mole ratio of aldehyde to phenol of at least 1:1, generally from 1.1:1.0 to 3.0:1.0 and preferably from 1.1:1.0 to 2.0:1.0, in the presence of a metal ion catalyst, preferably a divalent metal ion such as zinc, lead, manganese, copper, tin, magnesium, cobalt, calcium, or barium.

Generally, the phenols used to prepare the phenolic resole resins may be represented by the following structural formula:

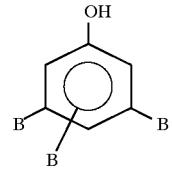

where B is a hydrogen atom, or hydroxyl radicals, or hydrocarbon radicals or oxyhydrocarbon radicals, or halogen atoms, or combinations of these. Multiple ring phenols such as bisphenol A may be used.

Specific examples of suitable phenols used to prepare the polybenzylic ether phenolic resins include phenol, o-cresol, p-cresol, p-butylphenol, p-amylphenol, p-octylphenol, and p-nonylphenol.

The aldehydes reacted with the phenol include any of the aldehydes heretofore used to prepare polybenzylic ether phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The polybenzylic ether phenolic resin is preferably non-aqueous. By "non-aqueous" is meant a polybenzylic ether phenolic resin which contains water in amounts of no more than about 10%, preferably no more than about 1% based on the weight of the resin. The polybenzylic ether phenolic resin used is preferably liquid or soluble in an organic solvent. Solubility in an organic solvent is desirable to achieve uniform distribution of the phenolic resin component on the aggregate. Mixtures of polybenzylic ether phenolic resins can be used.

Alkoxy-modified polybenzylic ether phenolic resins may also be used as the phenolic resin. These polybenzylic ether phenolic resins are prepared in essentially the same way as the unmodified polybenzylic ether phenolic resins previously described except a lower alkyl alcohol, typically methanol, is reacted with the phenol and aldehyde or reacted with an unmodified phenolic resin.

In addition to the polybenzylic ether phenolic resin, the phenolic resin component of the binder composition also contains at least one organic solvent. Preferably the amount of solvent is from 40 to 60 weight percent of total weight of the phenolic resin component. Specific solvents and solvent combinations will be discussed in conjunction with the solvents used in the polyisocyanate component.

Those skilled in the art will know how to select specific solvents for the phenolic resin component and polyisocyanate component. The organic solvents which are used with the polybenzylic ether phenolic resin in the polybenzylic ether phenolic resin component are aromatic solvents, esters, ethers, and alcohols, preferably mixtures of these solvents.

It is known that the difference in the polarity between the polyisocyanate and the polybenzylic ether phenolic resins restricts the choice of solvents in which both components are compatible. Such compatibility is necessary to achieve complete reaction and curing of the binder compositions of the present invention. Polar solvents of either the protic or aprotic type are good solvents for the polybenzylic ether phenolic resin, but have limited compatibility with the polyisocyanate.

The polar solvents should not be extremely polar such as to become incompatible with the aromatic solvent. Suitable polar solvents are generally those which have been classified in the art as coupling solvents and include firfural, furturyl alcohol, Cellosolve acetate, butyl Cellosolve, butyl Carbitol, diacetone alcohol, and Texanol. Other polar solvents include liquid dialkyl esters such as dialkyl phthalate of the type disclosed in U.S. Pat. No. 3,905,934 and other dialkyl esters such as dimethyl glutarate.

Aromatic solvents, although compatible with the polyisocyanate, are less compatible with the phenolic resins. It is, therefore, preferred to employ combinations of solvents and particularly combinations of aromatic and polar solvents. Suitable aromatic solvents are benzene, toluene, xylene, ethylbenzene, and mixtures thereof. Preferred aromatic solvents are mixed solvents that have an aromatic content of at least 90% and a boiling point range of 138° C. to 232° C.

Limited amounts of aliphatic and/or cycloaliphatic solvents or mixtures thereof may be used with the polyisocyanate component. Examples of such solvents are mineral spirits, kerosene, and napthas. Minor amounts of aromatic solvent may also be present in the solvents.

It may also be useful to add a bench life extender to the binder. A bench life extender retards the premature reaction of the two components of the binder system after they are mixed with sand. Prematurely reaction reduces flowability of the foundry mix and causes molds and cores made with the sand mix to have reduced strengths. The bench life extender is usually added to the polyisocyanate component of the binder. Examples of bench life extenders are organic phosphorus-containing compounds such as those described in U.S. Pat. No. 4,436,881 and U.S. Pat. No. 4,683,252, and inorganic phosphorus-containing compounds such as those described in U.S. Pat. No. 4,540,724 and U.S. Pat. No. 4,602,069, all of which are hereby incorporated by reference. The amount of bench life extender used in the polyisocyanate component is generally from 0.01 to 3.0 weight percent, preferably 0.1 to 0.8 weight percent based upon the total weight of the binder.

Drying oils, for example those disclosed in U.S. Pat. No. 4,268,425, may also be used in the polyisocyanate component. Drying oils may be synthetic or natural occurring and include glycerides of fatty acids which contain two or more double bonds whereby oxygen on exposure to air can be absorbed to give peroxides which catalyze the polymerization of the unsaturated portions.

Other optional ingredients include release agents and a silane, which is use to improve humidity resistance. See for example, U.S. Pat. No. 4,540,724, which is hereby incorporated into this disclosure by reference.

The binder system is preferably made available as a two-package system with the phenolic resin component in one package and the polyisocyanate component in the other package. Usually, the binder components are combined and then mixed with sand or a similar aggregate to form the foundry mix or the mix can be formed by sequentially mixing the components with the aggregate. Preferably the phenolic resin component is first mixed with the sand before mixing the isocyanate component with the sand. Methods of distributing the binder on the aggregate particles are well-known to those skilled in the art. The mix can, optionally, contain other ingredients such as iron oxide, ground flax fibers, wood cereals, pitch, refractory flours, and the like.

Various types of aggregate and amounts of binder are used to prepare foundry mixes by methods well known in the art. Ordinary shapes, shapes for precision casting, and refractory shapes can be prepared by using the binder systems and proper aggregate. The amount of binder and the type of aggregate used is known to those skilled in the art. The preferred aggregate employed for preparing foundry mixes is sand wherein at least about 70 weight percent, and preferably at least about 85 weight percent, of the sand is silica. Other suitable aggregate materials for ordinary foundry shapes include zircon, olivine, aluminosilicate, chromite sands, and the like.

In ordinary sand type foundry applications, the amount of binder is generally no greater than about 10% by weight and frequently within the range of about 0.5% to about 7% by weight based upon the weight of the aggregate. Most often, the binder content for ordinary sand foundry shapes ranges from about 0.6% to about 5%, preferably about 1% to about 5% by weight based upon the weight of the aggregate in ordinary sand-type foundry shapes.

Although the aggregate employed is preferably dry, small amounts of moisture, generally up to about 1.0 weight percent, more typically less than 0.5 weight percent, based on the weight of the sand, can be tolerated. This is particularly true if the solvent employed is non-water-miscible or if an excess of the polyisocyanate necessary for curing is employed since such excess polyisocyanate will react with the water.

The foundry mix is molded into the desired shape, whereupon it can be cured. Curing can be affected by passing a tertiary amine through the molded mix such as described in U.S. Pat. No. 3,409,579 which is hereby incorporated into this disclosure by reference.

The examples will illustrate specific embodiments of the invention. These examples along with the written description will enable one skilled in the art to practice the invention. It is contemplated that many other embodiments of the invention will be operable besides these specifically disclosed.

EXAMPLES

Example 1 illustrates the preparation of an amine modified polyisocyanates within the scope of this invention. Examples 2–3 illustrate the use of the amine modified polyisocyanates in foundry binder systems to make foundry cores by the cold-box process with and without a release agent. The tensile strengths were determined on a Thwing Albert Intelect II-Std. Instrument Company, Philadelphia, USA 19154 tensile tester. In all of the examples the test specimens were produced by the cold-box process by contacting the compacted mixes with triethylamine (TEA) for 1.0 second. All parts are by weight and all temperatures are in °C. unless otherwise specified. The following abbreviations are used in the examples:

MONDUR MRS 5=a polymethylene polyphenyl isocyanate sold by Bayer AG having a free NCO content of 32% and a functionality of 2.4.

MONDUR MR=a polymethylene polyphenyl isocyanate sold by Bayer AG having a free NCO content of 32% and a functionality of 2.7.

RESIN=a polybenzylic ether phenolic resin prepared with zinc acetate dihydrate as the catalyst and modified with the addition of 0.09 mole of methanol per mole of phenol prepared along the lines described in the examples of U.S. Pat. No. 3,485,797.

Example 1

(Modified MONDUR MRS-5 having an NCO content of 28% prepared with 4 mole % oleyl amine)

To a three neck-round bottom flask, equipped with a condenser, mechanical stirrer and dropping funnel, under an atmosphere of nitrogen was added MONDUR MRS-5 (100 parts, 32% NCO content). The isocyanate was cooled to 0° C. and to this was added oleyl amine (4 mole, 9.9 mL, 8 parts) dropwise over a period of ten minutes. The resulting modified isocyanate had an NCO content of 28% and a viscosity of 1.1 poise at room temperature (25° C.) and 0.15 poise at 60° C. as determined by Carri-Med rheometer. The modified polyisocyanate was mixed with an unmodified polyisocyanate, Mondur MRS-5, in a weight ratio of 1:3 such that the weight percent of oleyl amine in the mixture was 1.9 weight percent based upon the total weight of the polyisocyanate (modified and unmodified). The modified polyisocyanate was mixed with an unmodified polyisocyanate MONDUR MRS-5, in a weight ratio of 1:1 such that the weight percent of oleyl amine in the mixture was 3.7 weight percent based upon the total weight of the polyisocyanate (modified and unmodified).

Comparison A and Examples 2–3

(Formulations without a release agent.)

Comparison A and Examples 2–3 illustrate the preparation of a foundry test shape (dogbone shape). Comparison A uses an unmodified polyisocyanate while Examples 2 and 3 use the amine modified polyisocyanate of Example 1 or dilutions thereof, in a polyurethane-forming binder system containing no release agent. The formulations for Part I and Part II of the binder system are given in Table I.

TABLE I (FORMULATION OF BINDER)

PART I (RESIN COMPONENT)

| COMPONENT | AMOUNT (pbw) |
| --- | --- |
| RESIN | 55.0 |
| ALIPHATIC SOLVENT | 14.0 |
| AROMATIC SOLVENTS | 23.3 |
| SILANE | 0.8 |

PART II (POLYISOCYANATE COMPONENT)

| | MODIFIED POLY-ISOCYANATE (MPI) | | | UNMODIFIED POLYISOCYANATE (MONDUR MR) | |
| --- | --- | --- | --- | --- | --- |
| Example | MPI | pbw | wt % | wt % oleyl amine | pbw | wt. % |
| Comparison A | None | 0 | 0 | 0 | 73.3 | 100 |
| Example 2 | Example 1 | 18.33 | 25 | 1.9 | 54.98 | 75 |
| Example 3 | Example 1 | 36.65 | 50 | 3.7 | 36.65 | 50 |

| AROMATIC SOLVENTS | 23.6 |
| --- | --- |
| MINERAL SPIRITS | 2.3 |
| BENCH LIFE EXTENDER | 0.8 |

In Example A and 2–3, cores were made with the binders of Examples A and 2–3, by mixing sand with these formulations. Cores were made by mixing sand with these formulations. The sand mix (Manly 1L5W lake sand) included 55 weight percent of Part I and 45 weight percent of Part II (Table I). The sand mixture contained 1.5 weight percent of binder, as set forth in Table I, in 4000 parts of Manley 1L5W lake sand.

The resulting foundry mixes were compacted into a dogbone shaped core box by blowing and were cured using the cold-box process as described in U.S. Pat. No. 3,409,579. In this instance, the compacted mixes were then contacted with a mixture of TEA in nitrogen at 20 psi for 1.0 second, followed by purging with nitrogen that was at 60 psi for about 6 seconds, thereby forming AFS tensile test specimens (dog bones) using the standard procedure. The test shapes were obtained using a REDFORD CBT-1 core blower.

The tensile strengths of the dogbone shaped cores, made with a foundry mix having zero benchlife, were measured immediately (1 minute), 3 hours, 24 hours, and 24 hours after being stored at 100% relative humidity at ambient conditions in closed containers. They were also measured immediately and 24 hours after gassing with TEA after the foundry mix had a benchlife of three hours. Measuring the tensile strength of the dog bone shapes enables one to predict how the mixture of sand and binder will work in actual foundry operations. Lower tensile strengths for the shapes indicate that the phenolic resin and polyisocyanate reacted more extensively after mixing with the sand prior to curing.

The tensile properties of the MONDUR MRS-5 modified with oleyl alcohol are shown in Table II.

TABLE II

TENSILE STRENGTHS OF TEST CORES PREPARED WITH
MODIFIED AND UNMODIFIED POLYISOCYANATES
WITHOUT AN INTERNAL RELEASE AGENT

| EXAMPLE | A | B | 2 | 3 |
|---|---|---|---|---|
| TENSILE STRENGTHS (psi) | | | | |
| ZERO BENCH (1 MIN) | 138 | 128 | 123 | 109 |
| ZERO BENCH (1 HR) | 190 | 173 | 175 | 169 |
| ZERO BENCH (24 HR) | 170 | 168 | 180 | 150 |
| HUMIDITY @ 100% | 35 | 18 | 39 | 53 |
| 3 HR BENCH LIFE (IMMEDIATE) | 112 | 105 | 111 | 110 |
| 3 H BENCH LIFE (24 HR) | 132 | 125 | 164 | 150 |
| CORE WASH HOT | 31 | 30 | 39 | 29 |
| CORE WASH COLD | 88 | 75 | 110 | 109 |

Table II indicates that the humidity resistance of the cores increased when modified polysiocyanates were used without a corewash. The data further indicate that the humidity resistance increases even more as the amount of modification to the polyisocyanate by the oleyl amine is increased. The humidity resistance is considerably lower with an internal release agent. Example B contains an internal release agent and is compared to Examples A, 2 and 3 which do not contain an internal release agent.

Examples 4–5

(Determining release properties where no release agent was used in binder system.)

Using a cylinder sticking test, release properties were determined for cores made with binders containing a conventional unmodified polyisocyanate (comparison binder system MONDUR MRS-5), and the amine modified polyisocyanate of Example 1 (1.9 weight percent of oleyl amine) and Example 2 (3.7 weight percent of oleyl amine). The binder system, used with the modified polyisocyanate of Example 1, was the binder system of Example 2 shown in Table II. The binder system, used with the modified polyisocyanate of Example 1 (3.7 wt %), was the binder system of Example 3 shown in Table II. None of the binder systems contained the internal release agent.

The cylinder sticking test, used to test the release properties of cores made with the binder systems, involved repeatedly blowing Manley 1L5W Lake sand into a 2×4 inch stainless steel cylinder where it was cured with TEA. A tensile tester was used to determine the pressure (lbs) it would take to remove the cured cylindrical sand from the steel cylinder. The binder level was 1.5 weight percent with 55 weight percent of Part I and 45 weight percent of Part II in the formulation.

The core blower used was a Redford CBT-1 with a gassing pressure of 20 psi, and blow pressure of 60 psi. The tensile tester to measure the pressure was a QC-1000 Tensile Tester Thwing-Albert Instrument Company, Philadelphia, USA 19154.

Table IV, the results of which are graphically depicted in FIG. 1, shows data which results from comparing a commercial polyisocyanate, MONDUR MRS-5, with an amine modified polyisocyanate. The formulations for the binders are shown in Table 1. FIG. 1 shows the pressures of the amine modified polyisocyanates being much lower than the unmodified polyisocyanates, i.e., the modified polyisocyanates have a much better release property. Also, with increasing levels of oleyl amine in the polyisocyanate backbone gives pressures which are even lower than the unmodified polyisocyanates. The oleyl amine modified polyisocyanates gave excellent release properties in comparison to the unmodified polyisocyanates.

TABLE IV (COMPARISON OF CORE RELEASE FOR BINDERS
MADE WITH UNMODIFIED POLYISOCYANATES AND
AMINE MODIFIED POLYISOCYANATES)

| CYCLES | 1 | 5 | 10 | 15 | 20 | 25 | 30 | 40 | 50 | 60 |
|---|---|---|---|---|---|---|---|---|---|---|
| EXAMPLE | | | | PRESSURE (LBS) | | | | | | |
| Comparison C | 90 | 170 | 250 | 305 | 316 | 350 | | | | |
| 4 | 12 | 21 | 22 | 42 | 34 | 36 | 56 | 73 | 40 | 61 |
| 5 | 9 | 17 | 23 | 27 | 26 | 42 | 40 | 54 | 34 | 55 |

We claim:

1. A polyurethane-forming foundry binder system curable with a catalytically effective amount of an amine curing catalyst comprising as separate components:
   (A) a phenolic resin component; and
   (B) a polyisocyanate component comprising a polyisocyanate wherein said polyisocyanate is modified by the reaction of said polyisocyanate with an aliphatic monoamine selected from the group consisting of primary amines, secondary amines, and mixtures thereof.

2. The binder system of claim 1 wherein the phenolic resin component comprises a (a) a polybenzylic ether phenolic resin prepared by reacting an aldehyde with a phenol such that the molar ratio of aldehyde to phenol is from 1.1:1 to 3:1 in the presence of a divalent metal catalyst, and (b) a solvent in which the resole resin is soluble.

3. The binder system of claim 2 wherein the phenol is selected from the group consisting of phenol, o-cresol, p-cresol, and mixtures thereof.

4. The binder system of claim 3 wherein the aldehyde is formaldehyde.

5. The binder system of claim 4 wherein the NCO content of the polyisocyanate component is from 12% to 33%.

6. The binder system of claim 5 where the compound containing one active hydrogen atom is selected from the group consisting of isocetyl amine, isostearyl amine, oleyl amine, and mixtures thereof.

7. The binder system of claim 6 wherein the ratio of hydroxyl groups of the polybenzylic ether phenolic resin to the isocyanate groups of the polyisocyanate hardener is from 0.80:1.2 to 1.2:0.80.

8. The binder system of claim 7 wherein the divalent metal catalyst used to prepare the phenolic resin is zinc.

9. The binder system of claim 8 wherein the NCO content of the modified polyisocyanate is from 12 percent to 33 percent.

10. A foundry mix comprising:
    (A) a major amount of aggregate; and
    (B) an effective bonding amount of the binder system of claim 1, 2, 3, 4, 5, 6, 7, 8, or 9.

11. The foundry mix of claim 10 wherein the binder composition is about 0.6 to 5.0 weight percent based upon the weight of the aggregate.

12. A process for preparing a foundry shape by the cold-box process which comprises:
    (a) forming a foundry mix as set forth in claim 10;
    (b) forming a foundry shape by introducing the foundry mix obtained from step (a) into a pattern;
    (c) contacting the shaped foundry mix with a tertiary amine catalyst; and (d) removing the foundry shape of step (c) from the pattern.

13. The process of claim 12 wherein the tertiary amine catalyst is a gaseous tertiary amine catalyst.

14. The process of claim 13 wherein the amount of said binder composition is about 0.6 percent to about 5.0 percent based upon the weight of the aggregate.

15. The process of claim 12 wherein the tertiary amine catalyst is a liquid tertiary amine catalyst.

16. The process of casting a metal which comprises:
(a) preparing a foundry shape in accordance with claim 12;
(b) pouring said metal while in the liquid state into and a round said shape;
(c) allowing said metal to cool and solidify; and
(d) then separating the molded article.

\* \* \* \* \*